US009874934B1

United States Patent
Ahuja et al.

(10) Patent No.: US 9,874,934 B1
(45) Date of Patent: Jan. 23, 2018

(54) SYSTEM, METHOD, AND RECORDING MEDIUM FOR TRACKING GAZE WITH RESPECT TO A MOVING PLANE WITH A CAMERA WITH RESPECT TO THE MOVING PLANE

(71) Applicant: International Business Machines Corporation, Armonk, NY (US)

(72) Inventors: Karan Ahuja, Yorktown Heights, NY (US); Kuntal Dey, New Delhi (IN); Seema Nagar, Bangalore (IN); Roman Vaculin, Bronxville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/223,674

(22) Filed: Jul. 29, 2016

(51) Int. Cl.
*G06F 3/01* (2006.01)
*G06T 7/00* (2017.01)
*G06K 9/00* (2006.01)

(52) U.S. Cl.
CPC .......... *G06F 3/013* (2013.01); *G06K 9/0061* (2013.01); *G06K 9/00604* (2013.01); *G06T 7/0042* (2013.01); *G06T 2207/30201* (2013.01)

(58) Field of Classification Search
CPC .. G06F 3/013; G06K 9/00604; G06K 9/0061; G06K 9/00617; G06T 2207/30201; A61B 3/113
See application file for complete search history.

(56) References Cited

U.S. PATENT DOCUMENTS

| 2003/0123027 A1* | 7/2003 | Amir | G06K 9/00604 351/209 |
| 2009/0196460 A1* | 8/2009 | Jakobs | G06F 3/013 382/103 |
| 2016/0095511 A1* | 4/2016 | Taguchi | A61B 3/0025 351/209 |
| 2016/0262614 A1* | 9/2016 | Ninomiya | A61B 3/0008 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Abbas Abdulselam
(74) *Attorney, Agent, or Firm* — Yeen Tham, Esq.; McGinn IP Law Group, PLLC

(57) ABSTRACT

A gaze tracking method, system, and non-transitory computer readable medium for tracking an eye gaze on a screen of a device including a fixed camera, include calculating a parametric equation of an eye gaze vector passing through a pupil of a user and an eye ball center of the user, computing a first angle of the screen with respect to a fixed plane relative to the screen based on a preset angle of the screen and an object, calculating a current plane of the screen based on the first angle and a position of the fixed camera with respect to the screen, and calculating an intersection of the eye gaze vector calculated by the calculating the parametric equation with the current plane equation calculated by the calculating the current plane.

19 Claims, 7 Drawing Sheets

SYSTEM, METHOD, AND RECORDING MEDIUM FOR TRACKING GAZE WITH RESPECT TO A MOVING PLANE WITH A CAMERA WITH RESPECT TO THE MOVING PLANE

BACKGROUND

The present invention relates generally to a gaze tracking system, and more particularly, but not by way of limitation, to a system for eye gaze detection and tracking on devices enabled with a camera that is fixed with respect to a moving plane of a screen (e.g., a lap-top, web-cam mounted on a screen, etc.).

Conventional gaze tracking techniques can track gaze in three-dimensions using a two-dimensional monocular camera if the screen is stationary in terms of angle. However, in a practical gaze tracking scenario, a distance and an angle of a user will change between a user and a device (e.g., a lap-top, web-cam mounted on a screen, etc.) because no user can be expected to practically stay and hold a device at a static position along with the angle of the screen can change such as rotating a lap-top screen at the hinge of the lap-top.

Further, conventional techniques for gaze estimation use screen calibration techniques involving mirrors in front of the cameras to get the screen planes rotation and transformation matrix and hence plane.

Also, the algorithms that exist for conventional devices are not capable of working when the angle of the screen changes, thereby altering the mapping of the distance of the human eye and the different points of the screen from the original distance.

That is, there is a technical problem in the conventional techniques that if the angle of the screen changes, then a re-mapping of the screen onto the camera frame is required.

SUMMARY

In view of the technical problem, the inventors have considered a non-abstract improvement to a computer technology via a technical solution to the technical problem in which a system can track the three-dimensional gaze of a user with a camera fixed with respect to a screen when the plane of the screen (e.g., angle of the plane) changes while the user views the screen to which the gaze tracking system dynamically adjusts without loss of accuracy or performance.

In an exemplary embodiment, the present invention can provide a gaze tracking system for tracking an eye gaze on a screen of a device including a fixed camera, the system including a gaze vector calculating circuit configured to calculate a parametric equation of an eye gaze vector passing through a pupil of a user and an eye ball center of the user, a coordinate change computing circuit configured to compute a first angle of the screen with respect to a fixed plane relative to the screen based on a preset angle of the screen and an object, a plane calculating circuit configured to calculate a current plane of the screen based on the first angle and a position of the fixed camera with respect to the screen, and an intersection calculating circuit configured to calculate an intersection of the eye gaze vector calculated by the gaze vector calculating circuit with the current plane equation calculated by the plane calculating circuit.

Further, in another exemplary embodiment, the present invention can provide a gaze tracking method for tracking an eye gaze on a screen of a device including a fixed camera, the method including calculating a parametric equation of an eye gaze vector passing through a pupil of a user and an eye ball center of the user, computing a first angle of the screen with respect to a fixed plane relative to the screen based on a preset angle of the screen and an object, calculating a current plane of the screen based on the first angle and a position of the fixed camera with respect to the screen, and calculating an intersection of the eye gaze vector calculated by the calculating the parametric equation with the current plane equation calculated by the calculating the current plane.

Even further, in another exemplary embodiment, the present invention can provide a non-transitory computer-readable recording medium recording a gaze tracking program for tracking an eye gaze on a screen of a device including a fixed camera, the program causing a computer to perform: calculating a parametric equation of an eye gaze vector passing through a pupil of a user and an eye ball center of the user, computing a first angle of the screen with respect to a fixed plane relative to the screen based on a preset angle of the screen and an object, calculating a current plane of the screen based on the first angle and a position of the fixed camera with respect to the screen, and calculating an intersection of the eye gaze vector calculated by the calculating the parametric equation with the current plane equation calculated by the calculating the current plane.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
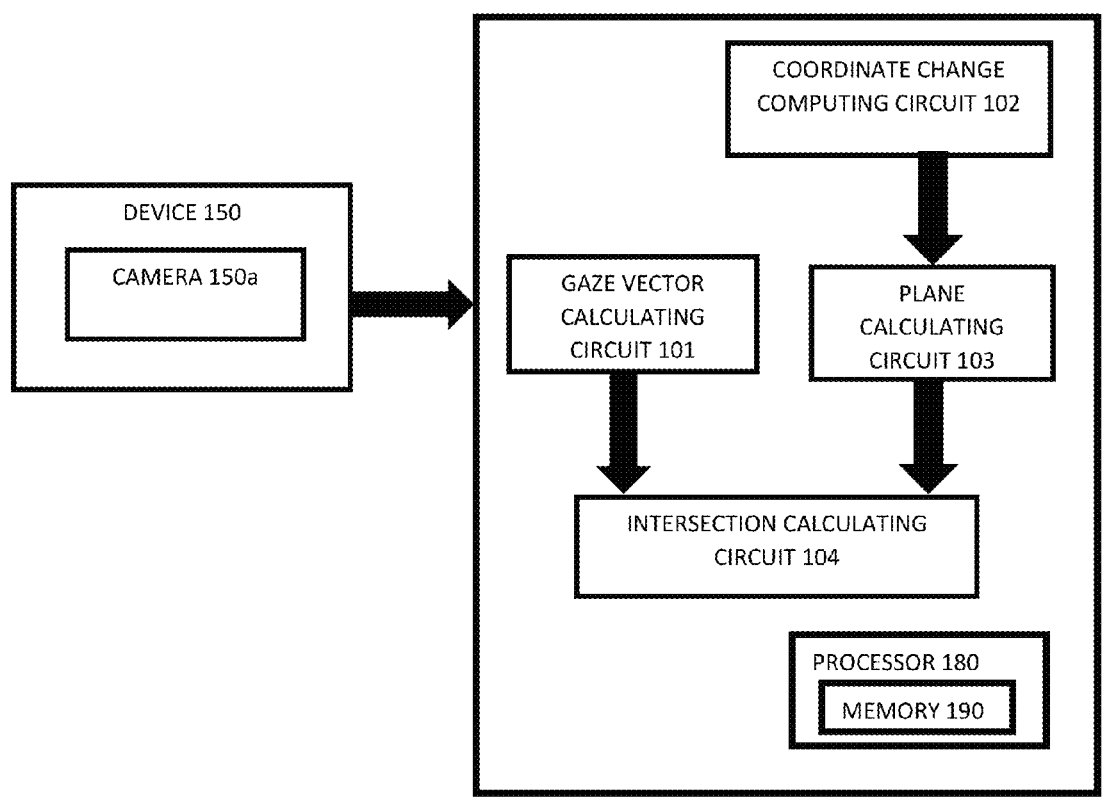
FIG. 1 exemplarily shows a block diagram illustrating a configuration of a gaze tracking system 100.

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the gaze tracking system 100 includes a gaze vector calculating circuit 101, a coordinate change computing circuit 102, a plane calculating circuit 103, and an intersection calculating circuit 104. The gaze tracking system 100 includes a processor 180 and a memory 190, with the memory 190 storing instructions to cause the processor 180 to execute each circuit of the gaze tracking system 100. The processor and memory may be physical hardware components, or a combination of hardware and software components.

Although the gaze tracking system 100 includes various circuits, it should be noted that a gaze tracking system can include modules in which the memory 190 stores instructions to cause the processor 180 to execute each module of the gaze tracking system 100.

Also, each circuit can be a stand-alone device, unit, module, etc. that can be interconnected to cooperatively produce a transformation to a result.

Figure 6:
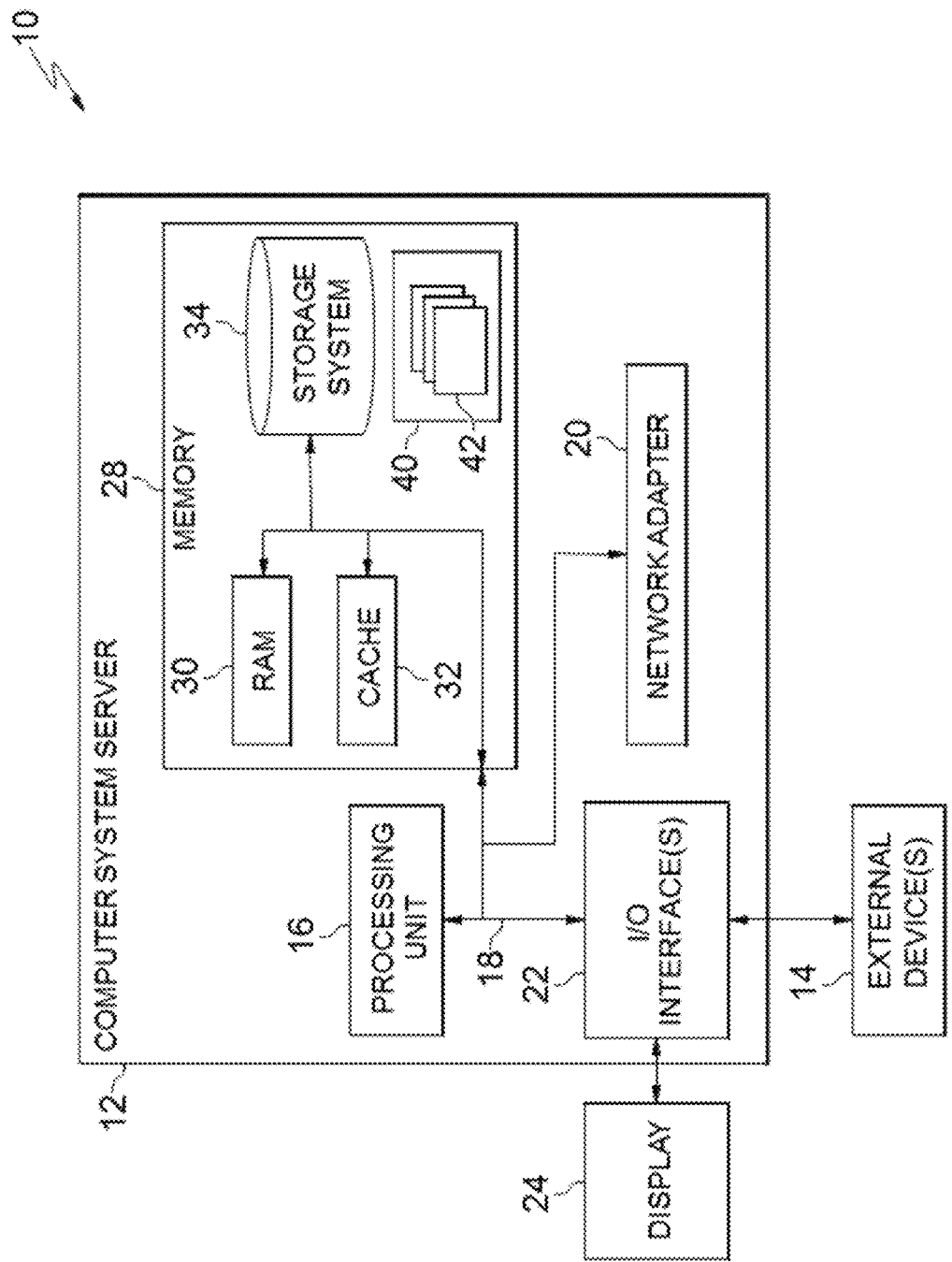
FIG. 6 depicts a cloud computing node 10 according to an exemplary embodiment of the present invention.
Figure 7:
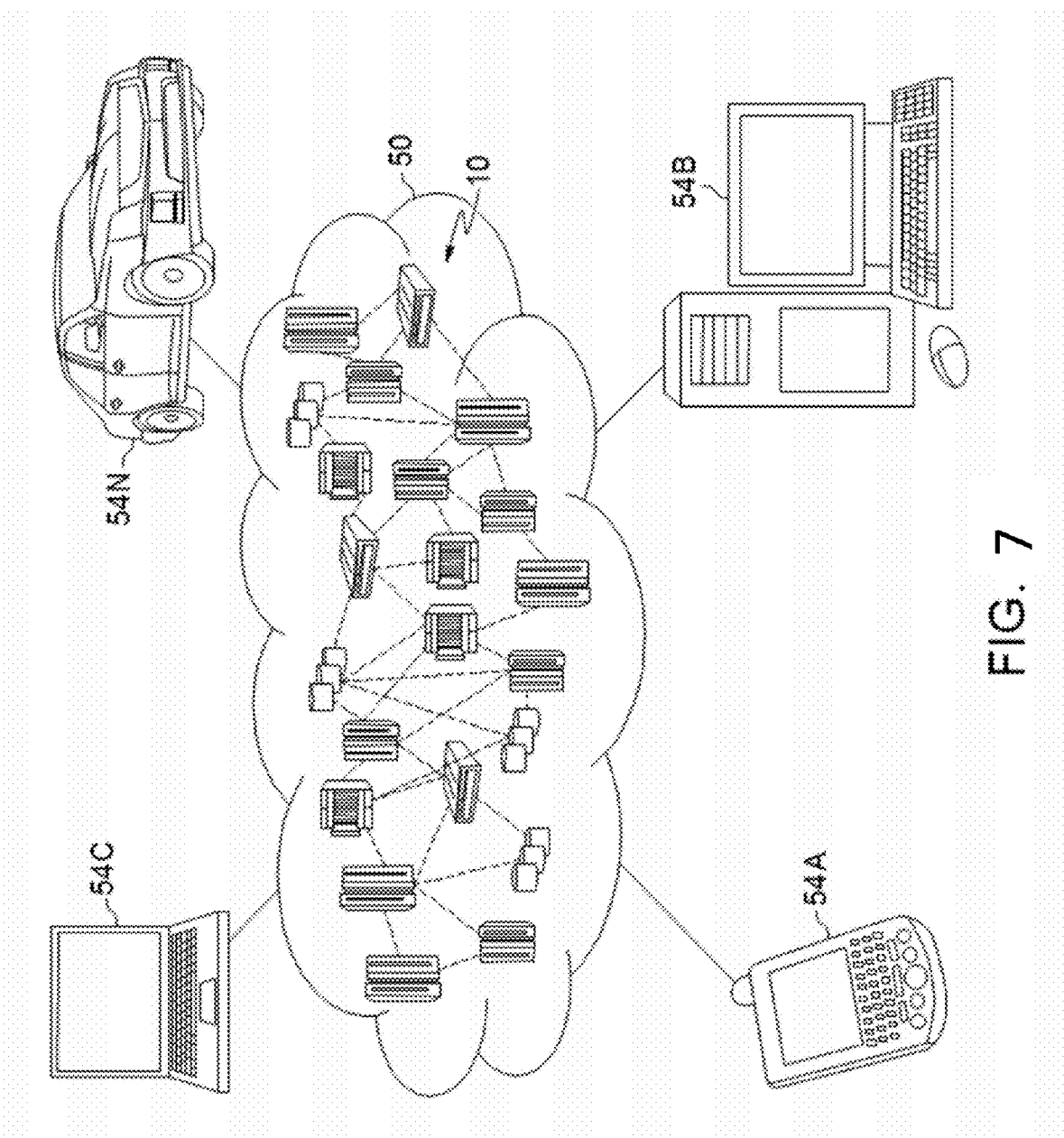
FIG. 7 depicts a cloud computing environment 50 according to another exemplary embodiment of the present invention.
Figure 8:
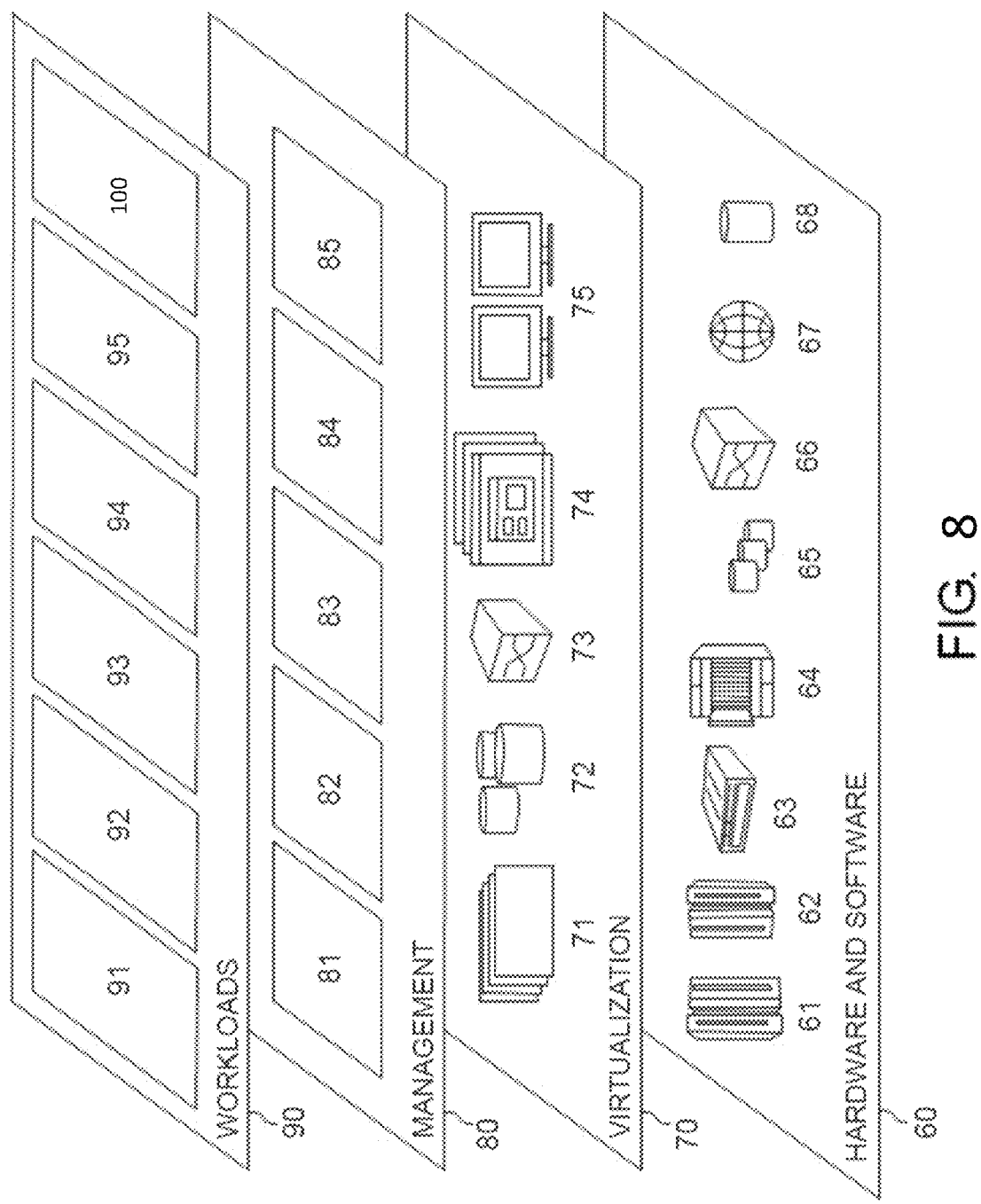
FIG. 8 depicts abstraction model layers according to an exemplary embodiment of the present invention.

Although as shown in FIGS. 6-8 and as described later, the computer system/server 12 is exemplarily shown in cloud computing node 10 as a general-purpose computing circuit which may execute in a layer the gaze tracking system 100 (FIG. 7), it is noted that the present invention can be implemented outside of the cloud environment.

The gaze vector calculating circuit 101 calculates a parametric equation of a gaze vector passing through a pupil and an eye ball center of the user of a device 150 as detected by the fixed camera 150*a*. That is, the gaze vector calculating circuit 101 estimates the three-dimensional coordinates of the eye corners and the pupil with respect to the camera frame of the fixed camera 150*a* and calculates a head pose of a face of the user with respect to the camera frame based on a stored three-dimensional Head Model. From the head pose obtained, the gaze vector calculating circuit 101 maps the three-dimensional coordinates of the eye corners and pupil with respect to the camera frame. It is noted that the eye corners can include two corners of the eye (e.g., as shown in FIG. 3) or four corners of the eye to estimate the pupil location.

Further, it is noted that the camera is a fixed camera 150*a* with respect to the screen (e.g., the camera position does not move with respect to a plane of the screen).

Figure 3:
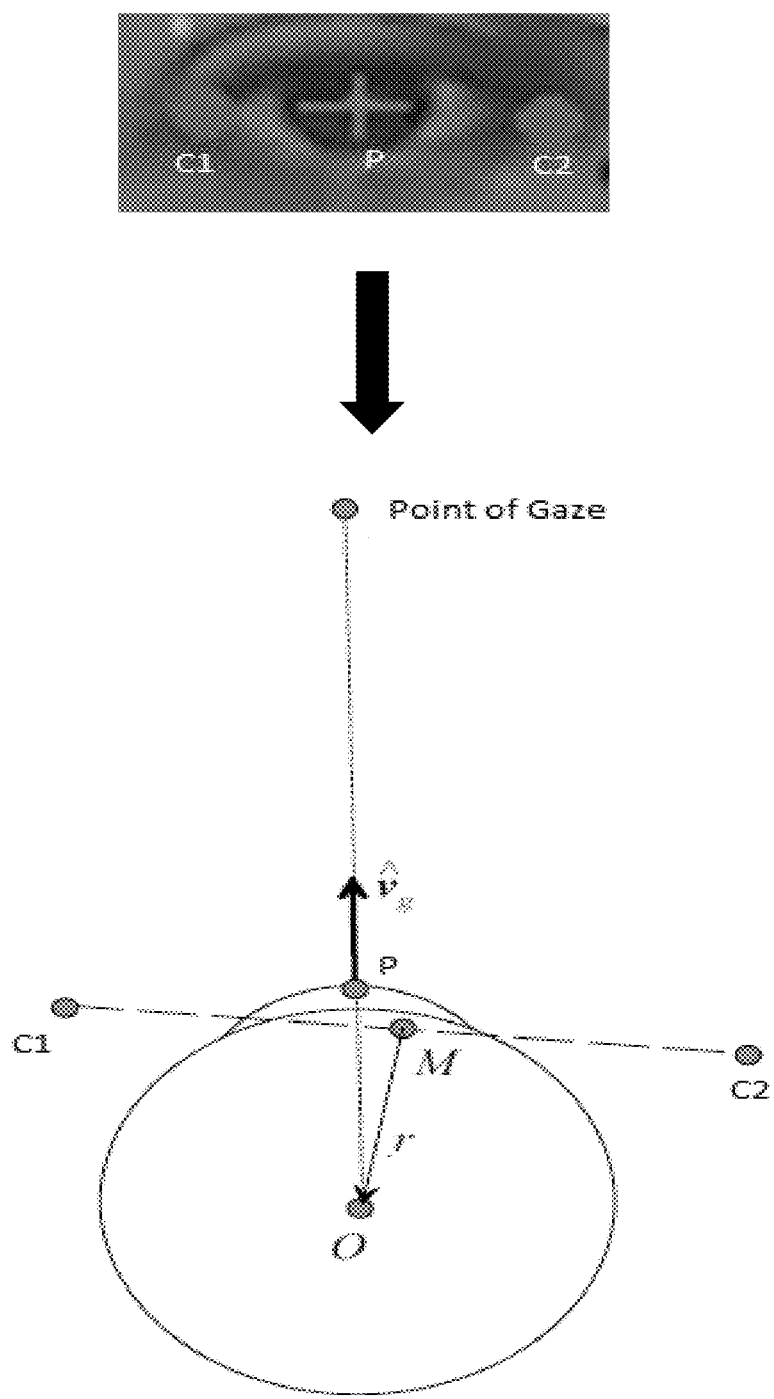
FIG. 3 exemplarily shows a pupil location calculation and a gaze vector calculation.

Based on the coordinates of the eye corners as shown in FIG. 3, the gaze vector calculating circuit 101 calculates the eye-ball center coordinate using equation (1) with O being the Eye ball Center; C1,C2 being Eye Corners; M being the midpoint between the eye corners (e.g., (C1+C2)/2); r being a Radius of the eye ball; and P being the Pupil position.

$$O = M + r \quad (1)$$

Then, using the calculation of the eye ball center of equation (1), the gaze vector calculating circuit 101 calculates the parametric equation of the gaze vector passing through the pupil and the eye ball center using equation (2) where Vg is the Gaze Vector as shown in FIG. 3.

$$Vg = P - O \quad (2)$$

Also, the gaze vector calculating circuit 101 compute the coordinates in (x, y, z) format for an object P. Object "P" can include any fixed position, but preferably comprises the pupil position. The gaze vector calculating circuit 101 computes the object position, for example, using algorithms such as three-dimensional head pose computation, such as camera focal length computation with many existing software such as "OpenCV" support such computation.

Figure 4:
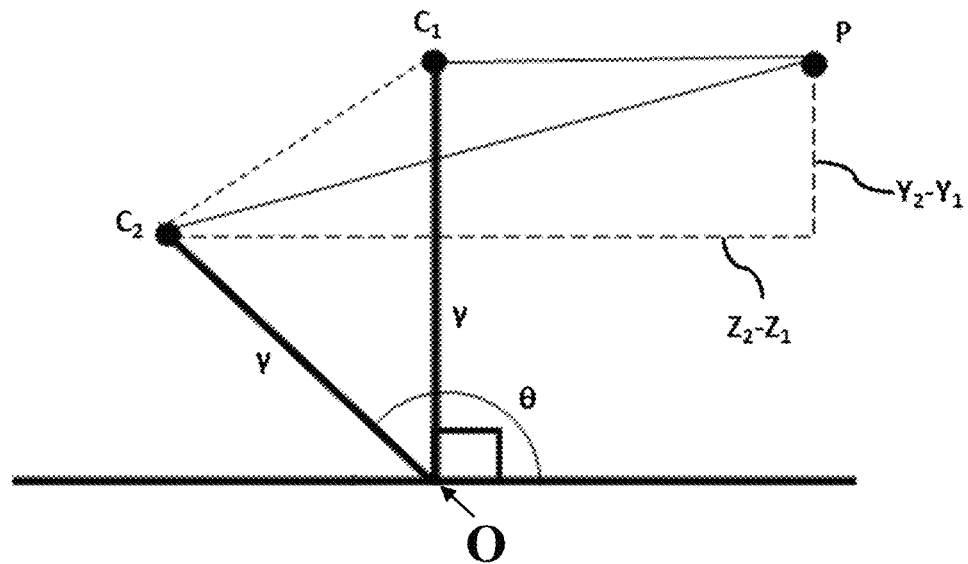
FIG. 4 exemplarily shows a coordinate change computing circuit 102 initially calculating an angle of the screen.

The coordinate change computing circuit 102 computes a first angle ("$\theta_1$") of the screen with respect to the base of the screen (e.g., a fixed surface such as the base of a lap-top or a desk of a web-cam) using an initialization calculation (e.g., as shown in FIG. 4) by bootstrapping the screen to keep the hinge angled at 90-degrees from the base of the screen (or some other degree that is pre-determined by policy or recommendation). The coordinate change computing circuit 102 further continuously computes a second angle ("$\theta_2$") based on the first angle (e.g., a previous angle).

Specifically, as shown in FIG. 4, "$C_1$" and "$C_2$" are positions of the fixed camera 150*a* on the screen at a 90° angle (e.g., screen is at a stationary registered plane or another predetermined angle can be used as long as the angle is known) and at the second angle of "$\theta$". Taking "$C_1$" as the origin, ($X_1$, $Y_1$, $Z_1$) are the coordinates of object "P" and with "$C_2$" as the origin, (X, $Y_2$, $Z_2$) are the coordinates of object "P". The coordinates of "$C_1$" are (0, γ, 0) and the coordinates of "$C_2$" are (0, γ sin(θ), γ cos(θ)) with "θ" being the angle of the screen.

Therefore, the points can be represented using equations (3) and (4) below:

$$-\gamma \cos(\theta) = Z_2 - Z_1 \quad (3)$$

$$\gamma - \gamma \sin(\theta) = Y_2 - Y_1 \quad (4)$$

The initial angle of rotation of the screen including the fixed camera 150*a* is shown in equation (5) by the coordinate change computing circuit 102 by solving equations (3) and (4) for "θ".

$$\theta = \cos^{-1}((Z_1 - Z_2)/\gamma) \quad (5)$$

Therefore, the initial angle of rotation of the screen including the fixed camera 150*a* is shown in equation (3) by the coordinate change computing circuit 102 solving for "θ".

Figure 5:
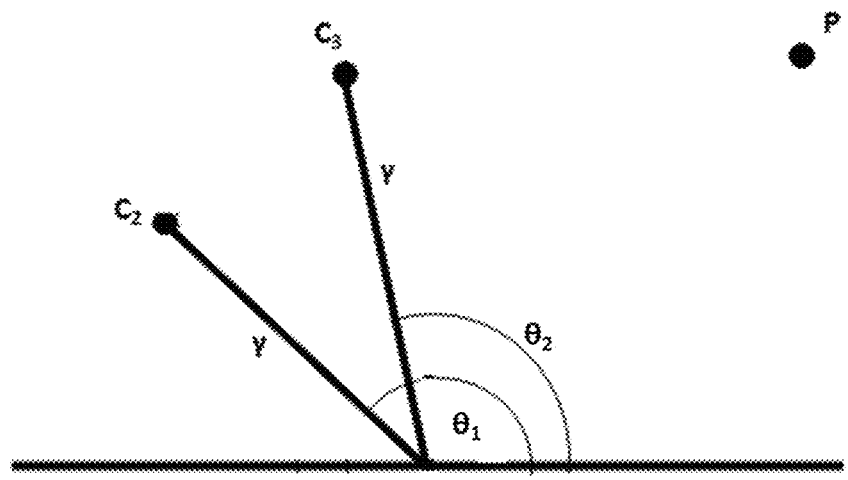
FIG. 5 exemplarily shows the coordinate change computing circuit 102 calculating a change in the angle of the screen from the initial position.

Further, the coordinate change computing circuit 102 can continuously calculate the angle of the screen after the first angle is initialized as shown in FIG. 5.

FIG. 5 depicts the screen of the device 150 moving to a new angle "$\theta_2$" when the fixed camera 150*a* is at point "$C_3$". It is noted that "$\theta_1$" is the first angle of the screen from FIG. 4.

The new angle "$\theta_2$" can be represented using equations (6) and (7) below:

$$\gamma \sin(\theta_1) - \gamma \sin(\theta_2) = Y_2 - Y_1 \quad (6)$$

$$-\gamma \cos(\theta_1) + \gamma \cos(\theta_2) = Z_2 - Z_1 \quad (7)$$

That is, any new angle of rotation of the screen including the fixed camera 150a "$\theta_2$" can be continuously calculated by the coordinate change computing circuit 102 using equations (6) and (7) by solving for "$\theta_2$".

The plane calculating circuit 103 calculates an equation of the plane of the screen based on the angle of rotation of the screen (e.g., "$\theta$" as solved using the above equations by the coordinate change computing circuit 102).

It is noted that "$\psi$" represents the acute angle of the angle of rotation of the screen (e.g., 180−$\theta$=$\psi$), that the horizontal width of the screen is "W", and that the vertical height of the screen is "L".

The plane calculating circuit 103 sets the fixed camera 150a to having coordinates of (0, 0, 0), and two other plane coordinates of (−W/2, L sin($\psi$), L cos($\psi$)) and (−W/2, L sin($\theta$), L cos($\theta$)). It is noted that the fixed camera 150a is assumed at (0, 0, 0) using an assumed plane equation of Z=0 but that any known plane equation can be used.

The plane calculating circuit 103 calculates the plane equation of the screen using the three coordinate points via, for example, Cramer's Rule. In other words, the plane calculating circuit 103 calculates the plane of the screen using the current angle of the screen of the device 150, a last angle of the screen of the device 150, and a position of the fixed camera to calculate the current plane equation of the screen of the device 150 as computed by the coordinate change computing circuit 102.

The intersection calculating circuit 104 calculates an intersection of the gaze vector calculated by the gaze vector calculating circuit 101 with the current plane equation calculated by the plane calculating circuit 103. In other words, using the matrix created by the plane calculating circuit 103, the intersection calculating circuit 104 calculates the intersection of the gaze vector to the current plane of the screen of the device 130.

Figure 2:
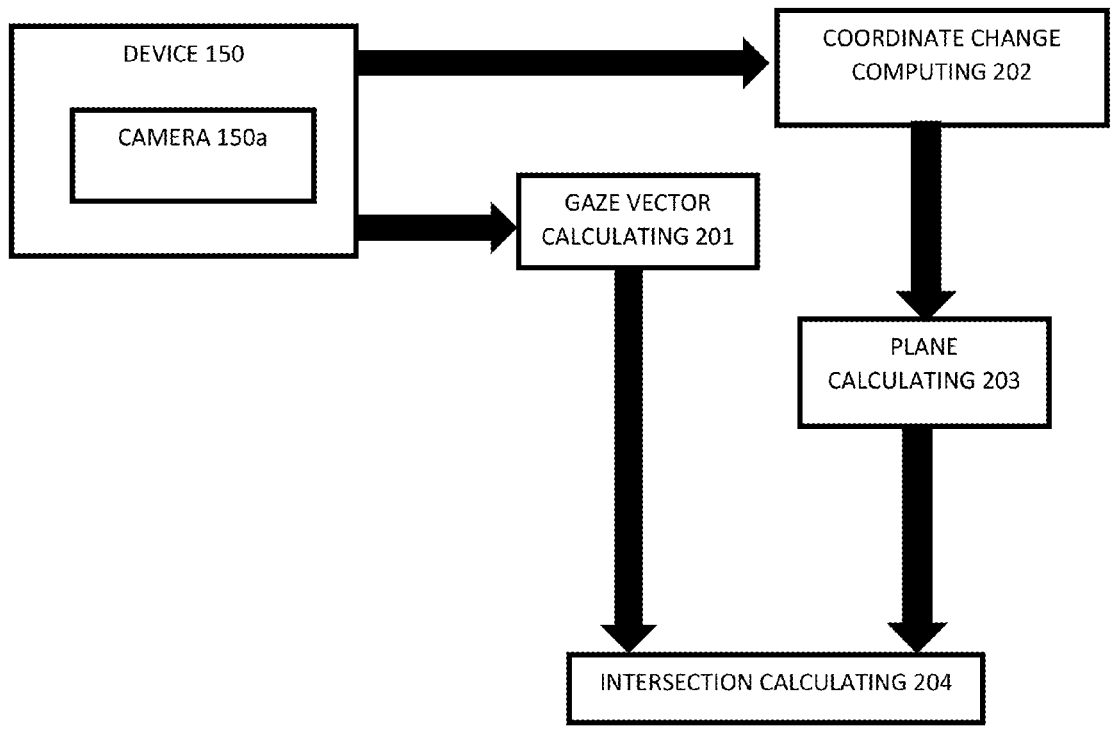
FIG. 2 exemplarily shows a high level flow chart for a gaze tracking method 200.

FIG. 2 shows a high level flow chart for a method 200 of gaze tracking.

Step 201 calculates a parametric equation of a gaze vector passing through a pupil and an eye ball center of the user of a device 150 as detected by the monocular camera 150b.

Step 202 computes a first angle of the screen with respect to a base of the screen (e.g., a fixed surface such as the base of a lap-top or a desk of a web-cam) using an initialization calculation (e.g., as shown in FIG. 4) by bootstrapping the screen to keep the hinge angled at 90-degrees from the base of the screen (or some other degree that is pre-determined by policy or recommendation). Step 202 further continuously computes the angle based on the first angle of the screen.

Step 203 calculates the plane of the screen using the current angle of the screen of the device 150, a last angle of the screen of the device 150, and a position of the fixed camera to calculate the current plane equation of the screen of the device 150 as computed by the Step 202.

Step 204 calculates an intersection of the gaze vector calculated by Step 201 with the plane equation calculated by Step 203.

Therefore, the system 100 and method 200 can detect and measure the rotation of a hinged plane of display with respect to the eye gaze, and combine such rotation with three-dimensional movement of the camera device 130, in a setting where the camera is constant with respect to the screen (e.g., a laptop computer, fixed webcam, etc.), for the purpose of point of gaze localization to estimate the three-dimensional gaze on the screen using, for example, one monocular RGB camera for input, in absence of any sensor (such as accelerometer, depth sensor etc.), and without performing any calibration except just a one-time initialization of the system 100 and method 200.

That is, the system 100 and method 200 can detect and measure the rotation of a hinged plane of display with respect to the eye gaze, and combine such rotation with three-dimensional movement of the camera device, in a setting where the camera is constant with respect to the screen (such as a laptop computer, fixed webcam), for the purpose of point of gaze localization to better estimate the three-dimensional gaze on the screen using one monocular RGB camera for input, in absence of any sensor (such as accelerometer, depth sensor etc.), and without performing any additional screen calibration.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 6, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the gaze tracking system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A gaze tracking system for tracking an eye gaze on a screen of a device including a camera, the system comprising:
   a gaze vector calculating circuit configured to calculate a parametric equation of an eye gaze vector passing through a pupil of a user and an eye ball center of the user;
   a coordinate change computing circuit configured to compute a first angle of the screen with respect to a fixed plane relative to the screen based on a preset angle of the screen and an object;
   a plane calculating circuit configured to calculate a current plane of the screen based on the first angle and a position of the camera with respect to the screen; and
   an intersection calculating circuit configured to calculate an intersection of the eye gaze vector calculated by the gaze vector calculating circuit with the current plane equation calculated by the plane calculating circuit.

2. The system of claim 1, wherein the coordinate change computing circuit continuously computes a next angle of the screen based on the last angle of the screen.

3. The system of claim 1, wherein the plane calculating circuit calculates the current plane of the screen based on the first angle and either an acute angle or an obtuse angle corresponding to the first angle.

4. The system of claim 1, wherein the gaze vector calculating circuit and the coordinate change computing circuit only use inputs of the camera to calculate the parametric equation of the eye gaze vector and the first angle of the screen.

5. The system of claim 1, wherein the object comprises a coordinate location of the pupil of the user.

6. The system of claim 1, wherein the object comprises a fixed point in space.

7. The system of claim 1, wherein the screen of the device rotates around a fixed axis.

8. The system of claim 1, wherein the screen of the device rotates around a fixed axis such that a coordinate location of the location of the camera changes only in two coordinate directions.

9. The system of claim 1, wherein the plane calculating circuit calculates the current plane of the screen based on a coordinate point using the first angle with a width of the screen and a length distance of the screen to the camera and either an acute angle or an obtuse angle corresponding to the first angle with the width of the screen and the length distance of the screen to the camera.

10. The system of claim 1, wherein the coordinate change computing circuit computes the first angle one time as a one-time initialization, and
wherein the coordinate change computing circuit computes a next angle based on the first angle.

11. The system of claim 10, wherein the coordinate change computing circuit computes the first angle one time as a one-time initialization,
wherein the coordinate change computing circuit computes a next angle based on the first angle, and
wherein the coordinate change computing circuit computes new angles based on the prior calculated angle.

12. The system of claim 11, wherein the position of the eye corners comprises four points surrounding the position of the location of the pupil.

13. The system of claim 1, wherein the gaze vector calculating circuit calculates the eye gaze vector by:
estimating a position of eye corners of the user and a location of the pupil in relation to the eye corners;
calculating the eye ball center of the user as a mid-point between the eye corners; and
determining the eye gaze vector as a vector passing through the eye ball center and the location of the pupil.

14. The system of claim 13, wherein the position of the eye corners comprises two points on opposite sides of the location of the pupil.

15. A gaze tracking method for tracking an eye gaze on a screen of a device including a camera, the method comprising:
calculating a parametric equation of an eye gaze vector passing through a pupil of a user and an eye ball center of the user;
computing a first angle of the screen with respect to a fixed plane relative to the screen based on a preset angle of the screen and an object;
calculating a current plane of the screen based on the first angle and a position of the camera with respect to the screen; and
calculating an intersection of the eye gaze vector calculated by the calculating the parametric equation with the current plane equation calculated by the calculating the current plane,
wherein the computing continuously computes a next angle of the screen based on the last angle of the screen to track the eye gaze on the screen.

16. The method of claim 15, wherein calculating the current plane calculates the current plane of the screen based on the first angle and either an acute angle or an obtuse angle corresponding to the first angle.

17. The method of claim 15, wherein the calculating the gaze vector and the computing only use inputs of the camera to calculate the parametric equation of the eye gaze vector and the first angle of the screen.

18. The method of claim 15, wherein the object comprises a coordinate location of the pupil of the user.

19. A non-transitory computer-readable recording medium recording a gaze tracking program for tracking an eye gaze on a screen of a device including a camera, the program causing a computer to perform:
calculating a parametric equation of an eye gaze vector passing through a pupil of a user and an eye ball center of the user;
computing a first angle of the screen with respect to a fixed plane relative to the screen based on a preset angle of the screen and an object;
calculating a current plane of the screen based on the first angle and a position of the camera with respect to the screen; and
calculating an intersection of the eye gaze vector calculated by the calculating the parametric equation with the current plane equation calculated by the calculating the current plane,
wherein the computing continuously computes a next angle of the screen based on the last angle of the screen to track the eye gaze on the screen.

* * * * *